United States Patent
Bergkvist et al.

(10) Patent No.: US 9,674,262 B2
(45) Date of Patent: Jun. 6, 2017

(54) METHOD AND ARRANGEMENTS FOR APPLICATION SCOPE MANAGEMENT

(75) Inventors: Adam Bergkvist, Luleå (SE); Per-Erik Brodin, Sollentuna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1217 days.

(21) Appl. No.: 13/498,064

(22) PCT Filed: Oct. 1, 2009

(86) PCT No.: PCT/SE2009/051094
§ 371 (c)(1),
(2), (4) Date: Mar. 23, 2012

(87) PCT Pub. No.: WO2011/040848
PCT Pub. Date: Apr. 7, 2011

(65) Prior Publication Data
US 2012/0179808 A1 Jul. 12, 2012

(51) Int. Cl.
*G06F 15/173* (2006.01)
*H04L 29/08* (2006.01)
(52) U.S. Cl.
CPC ............ *H04L 67/025* (2013.01); *H04L 67/02* (2013.01); *H04L 67/16* (2013.01)
(58) Field of Classification Search
CPC ... H04L 29/06; H04L 12/1813; H04L 65/403; H04L 5/4401; H04L 19/61; H04L 1/00204; H04L 69/32; H04N 5/4401; H04N 19/61; H04N 1/00204; H04N 21/8586; H04N 7/181; H04N 13/026; G06F 9/465;
(Continued)

(56) References Cited

U.S. PATENT DOCUMENTS 6,292,825 B1 9/2001 Chang et al.
6,883,024 B2 4/2005 Ullmann
(Continued)

OTHER PUBLICATIONS

Ericsson Labs, "Web Background Service", Sep. 10, 2009, retrieved from the internet on Apr. 29, 2013 at URL https://labs.ericsson.com/apis/web-background-service/documentation , 12 pages.
(Continued)

*Primary Examiner* — Arvin Eskandarnia
*Assistant Examiner* — Thao Duong
(74) *Attorney, Agent, or Firm* — Sage Patent Group

(57) ABSTRACT

An Application Scope Platform and a method for enabling communication between a Web Application, which is adapted to run on a first Processor of a User Device, and which is being accessible via a Web Client of the User Device, and an Application Scope, which is executable on the Application Scope Platform. The Application Scope Platform comprises a Process Manager, adapted to create and manage an event triggered Application Scope, a Web Server and a Communication Interface adapted to enable the Web Application to communicate with the Application Scope Platform via said Web Client. The Application Scope Platform being adapted to run on a second Processor, and to communicate with the Web Application, which is an Application Scope enabled Web Application, irrespective of the state of the Processor, the Web Client and/or said Web Application.

27 Claims, 5 Drawing Sheets

(58) Field of Classification Search
CPC .... G06F 9/4887; G06F 17/30345; G06F 8/63; G06F 8/65; G06F 3/04842
See application file for complete search history.

(56) References Cited

U.S. PATENT DOCUMENTS

| | | | |
|---|---|---|---|
| 7,325,042 B1 | 1/2008 | Soscia et al. | |
| 2003/0081617 A1* | 5/2003 | Deng | 370/398 |
| 2004/0139151 A1 | 7/2004 | Flurry et al. | |
| 2007/0106739 A1 | 5/2007 | Clark et al. | |
| 2007/0162469 A1* | 7/2007 | Kilian | H04L 67/02 |
| 2007/0239884 A1* | 10/2007 | Karmakar | H04L 67/26 |
| | | | 709/232 |
| 2009/0013310 A1* | 1/2009 | Arner | G06F 8/38 |
| | | | 717/120 |
| 2009/0077091 A1* | 3/2009 | Khen et al. | 707/10 |
| 2009/0313492 A1* | 12/2009 | Lerman | G06F 1/3203 |
| | | | 713/323 |
| 2010/0211872 A1* | 8/2010 | Rolston et al. | 715/702 |

OTHER PUBLICATIONS

European Supplementary Search Report Corresponding to European Application No. 09 85 0126; Dated: May 14, 2013; 8 Pages.
International Search Report, PCT Application No. PCT/SE2009/051094, Jun. 18, 2010, 5 pages.
Written Opinion of the International Searching Authority, PCT Application No. PCT/SE2009/051094, Jun. 18, 2010, 5 pages.
Notification of Reason for Refusal and English language translation, KR 10-2012-7008301, Jun. 20, 2016.

* cited by examiner

METHOD AND ARRANGEMENTS FOR APPLICATION SCOPE MANAGEMENT

CROSS REFERENCE TO RELATED APPLICATIONS

This application is a 35 U.S.C. §371 national stage application of PCT International Application No. PCT/SE2009/051094, filed on 1 Oct. 2009. The above-referenced PCT International Application was published in the English language as International Publication No. WO 2011/040848 A1 on 7 Apr. 2011. The disclosure of the above referenced application is hereby incorporated herein in its entirety by reference.

TECHNICAL FIELD

The present invention relates generally to a method and arrangements for managing Application Scope. In particular, the present invention refers to an enhanced mechanism for managing interaction between a Web Application and an associated Application Scope.

BACKGROUND

As the World Wide Web (WWW) is moving in the direction of becoming the ultimate platform for application development, new features are constantly being developed, which enable Web Applications to appear and act more similar to their corresponding Desktop counterparts. One such feature is typically referred to as a Web Worker, which may be seen as the Browser JavaScript equivalent to threads. Web Workers allow an application to defer tasks for background execution in a separate JavaScript scope, where a message-passing API enables a Web Worker to communicate with the main application thread. Other types of Web Workers, typically referred to as shared Web Workers, can be shared between different windows in an application, and a Web Worker will typically not terminate until the last open window that is connected to a shared Web Worker is closed.

Persistent Web Workers refers to Web Workers which outlive their parent application and continue their execution process in the background, and potentially even after the Web Browser itself has been closed. Although persistent Web Workers must run in a separate process to be able to outlive the Web Browser, they are tightly coupled to their Web Browser.

Although Persistent Web Workers may enable Web Applications to continue to run in the background, many battery powered devices, such as e.g. laptops, net books and cellular telephones, would not be able to keep the CPU powered up during extended periods of time, which is a main requirement to keep a persistent Web Worker running.

SUMMARY

The object of the present invention is to address the problems outlined above. In particular, it is an object of the present invention to provide a mechanism which enables communication to be initiated and resumed between a Persistent Application Scope, residing on an Application Scope Platform, and a Web Application, residing on a User Device, irrespective of the state of the Web Application, the Web Client, providing the Web Application access to the Application Scope, and even the Processor, which is supporting the Web Client.

According to one aspect, an Application Scope Platform for enabling communication between a Web Application, accessible via a Web Client of a User Device, which is adapted to run on a first Processor, and an Application Scope, executable on said Application Scope Platform, while the Application Scope Platform is adapted to run on a second Processor, is provided.

According to one exemplifying embodiment, the Application Scope Platform comprises a Process Manager, which is adapted to create and manage an event triggered Application Scope, a Web Server, is adapted to enable Web Application interaction between the Application Scope Platform and the Web Application, via the Web Client. The Application Scope is adapted to communicate with the Web Application, which is an Application Scope enabled Web Application, irrespective of the state of the first Processor, the Web Client and/or said Web Application.

The Process Manager may be adapted to associate a Web Application with an Application Scope by applying a shared key mechanism.

The Process Manager is also typically adapted to create an Application Scope by retrieving instructions and by loading said instructions into the Application Scope, in response to receiving a request for creating an Application Scope from a Web Application.

The instructions, used for creating an Application Scope may comprise any type of executable code, such as e.g. JavaScript, Java, or Flash.

An Application Scope may typically comprise instructions, in the form of executable code, which enables the Application Scope to monitor at least one activity for at least one triggered event. A monitoring Application Scope may also comprise instructions, which enables the Application Scope to invoke a Shared Resource of the User Device and/or the associated Web Application, in response to recognizing the occurrence of a triggered event.

The Process Manager is typically also adapted to reconnect a Web Application with an associated Application Scope, in response to receiving such a request from the Web Application, or from the associated Application Scope.

An Application Scope Platform, according to any of the suggested alternative embodiments, may also comprise a System Scope, constituting instructions, enabling said Application Scope to access one or more Shared Resources.

The System Scope may also be adapted to access one or more Shared Resources via a D-Bus mechanism. All or some of such Shared Resource may either be adapted to run on the first Processor, on a Processor other than the first Processor, or a combination thereof.

Typically, the System Scope may also be adapted to provide one or more enablers, each of which is adapted to be invoked from an associated Application Scope, in response to recognizing a trigger of a pre-defined event. Each one of such enablers may constitute an Application Program Interface (API), each of which may by e.g. a network API, adapted to receive and handle updates received from a network node; a notification API, adapted to notify a user of a triggered event; a sensor API, adapted to enable data to be acquired from a data source of the User Device; a storage API, adapted to enable storing and downloading of shared data on/from a shared storage area.

In addition to providing a shared storage area, a Shared Resource may be a network connection, such as e.g. a network connection for gaining access to the Internet, or a User Device function, such as e.g. GPS or positioning functionality.

In a typical embodiment, the Application Scope Platform is adapted to enable communication between a Web Application and an associated Application Scope by applying a Remote Procedure Call mechanism, such as e.g. RPC or REST. In case of using RPC, Extensible Markup Language (XML)-RPC, or JavaScript Object Notation (JSON)-RPC may be applied.

An Application Scope Platform may be implemented on an entity which is an integrated part of the User Device, or physically separated from the User Device. The former alternative may be preferable in many situations, especially since all functionality is arranged on the same device. The latter alternative may, however be preferred e.g. in situations where an Application Scope Platform is a fixed arrangement, where the power source is not a critical issue, and where one or more portable User Devices have access to the Application Scope Platform.

According to another aspect, an arrangement in a User Device for enabling a Web Application to communicate with an Application Scope, running on an Application Scope Platform, is provided. The User Device comprises a Web Client, which may be e.g. a Web Browser, which is adapted to run on a first Processor, and to enable communication between the Web Application and the Application Scope Platform. The Web Application comprises instructions, in the form of executable code, which enables it to create an Application Scope on the Application Scope platform, which is running on a second Processor. The User Device also comprises a Communication Interface (CI), which enables the Application Scope to invoke the Web Application, irrespective of the state of the first Processor, the Web Client and/or the Web Application.

If no automated invoking of an associated Web Application is required, in response to a triggered event, the Application Scope may be adapted to instead invoke a Shared Resource, comprising a display arrangement, which is adapted to present a notification, provided from the Application Scope. Such a notification will typically be provided to the Shared Resource for notifying a user of a triggered event in a running Application Scope, thereby enabling the user to choose whether to start the associated Web Application again, or to ignore the notification.

According to yet another aspect, a method of enabling communication between an Application Scope Platform and a Web Application is provided, where the Web Application is being accessible via a Web Client of a User Device, and wherein said Web Client is adapted to run on a first Processor, while the Application Scope Platform is adapted to run on a second Processor. The method, which is to be performed on an Application Scope Platform, according to any of the embodiments mentioned above, is initiated when a request for creating an event triggered Application Scope, associated with the Web Application, is received from the Web Application. In response to receiving such a request, the requested Application Scope is created by acquiring executable instructions and by loading these instructions into the requested Application Scope. Once created, the Application Scope starts to run according to the instructions. While running, the Application Scope is adapted to invoke the associated Web Application, whenever required, irrespective of the state of the first Processor, the Web Client and/or the Web Application.

The suggested method may comprise the further steps of monitoring at least one activity for at least one triggered event, and executing an activity in response to recognizing the triggered event. Such an activity may comprise activating the first Processor, the Web Client, and/or invoking the Web Application. A pre-defined event may also trigger an invoking of a Shared Resource, such that an Application Scope may e.g. exploit data obtained from the Shared Resource.

The invoking step may comprise the further step of providing a notification of a triggered event to the User Device, thereby enabling a user to choose whether to resume a respective Web Application, or to ignore the notification.

According to one embodiment, a notification may be provided to a Shared Resource of a User Device, which comprises a displaying Arrangement, on which the notification can be displayed to a user. Once a user has been alerted of a triggered event with a notification, he may choose to continue interaction between the Web Application and the Associated Application Scope.

The suggested activation and/or invoking step may typically be performed via an Inter-Process Communication System, such as e.g. a Remote Procedure Call (RPC) mechanism or a Representational State Transfer (REST) mechanism.

Further features of the present invention and its benefits can be understood from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Figure 1A:
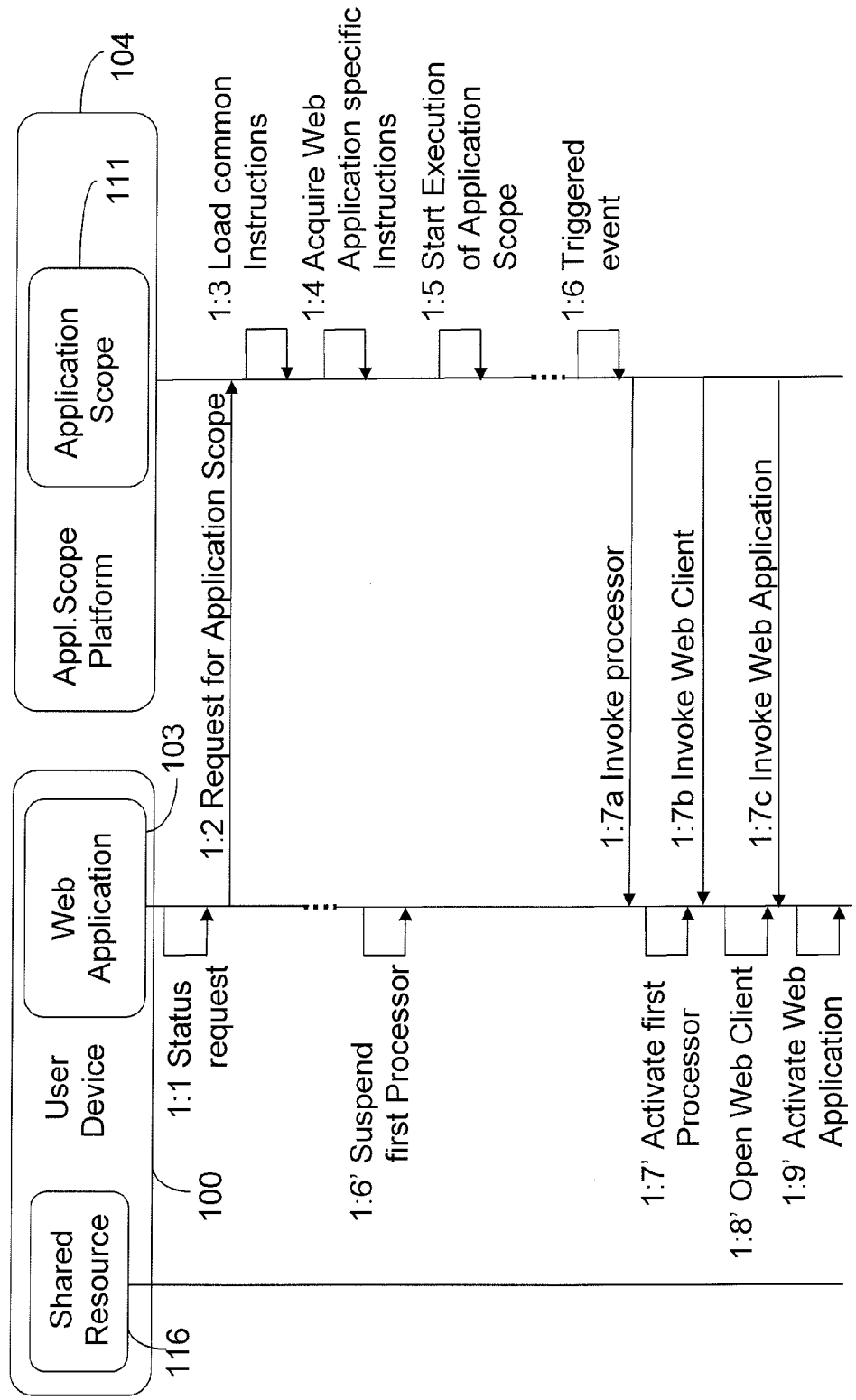
FIG. 1a is a simplified signaling diagram, illustrating an exemplifying Scenario, involving interaction between a Web Application and an associated Application Scope.

The claimed invention refers to a method and arrangements which enable a Web Application to always be able to react to external events, even when the Web Application itself is not running, the Web Client via which the Web Application is accessed is closed and/or the Processor running the Web Client has been suspended.

Known Web Worker solutions are based on a concept where a Persistent Web Worker is tightly integrated with the Web Browser, thereby making it complicated to separate the main one or more processes on which the Web Browser is running from the process, hosting common, background logic.

A concept is therefore proposed where a Web Application which is accessed via a Web Browser, or any other type of Web Client, such as e.g. a Web Runtime Widget, is running on a first Processor, while an Application Scope, which can be referred to as a background process, which is running in the background of a Web Application, is running on a second Processor. By applying different Processors for the Web Client/Web Application and the associated Application Scope, respectively, a more enhanced mechanism for enabling event based invoking of the Web Application from the Application Scope can be provided. Therefore the Application Scopes discussed in this document may also be referred to as Persistent Application Scopes, because of their extended ability to revoke an associated Web Application.

The suggested concept may be provided as a service, which from hereinafter will be referred to as an Application Scope Enabler Service, and, consequently, an arrangement which is adapted to host one or more Application Scopes, according to any of the suggested embodiments, and to provide such a service to Application Scope enabled Web Applications.

Throughout this document, an Application Scope is to be referred to as a set of instructions, provided in the form of executable code, which when created and run will execute one or more pre-defined tasks. An Application Scope constitutes common instructions, which have been pre-defined to support general functions for all Application Scopes. In order to create, or activate, an Application Scope, Application Scope specific instructions/code has to be acquired and loaded into the common instructions, such that an Application Scope which will be configured according to the requirements of a respective Web Application can be obtained.

In a typical scenario, the first Processor mentioned above may be a main CPU of a User Device, typically a mobile User Device, such as e.g. a mobile telephone, a PDA or a laptop, while the second Processor may e.g. be an application Processor, or any other type of Processor which requires a low power level to run. The second Processor may be arranged e.g. on a Mobile Broadband Module, or any other standalone entity.

Both Processors, and the associated functionality running on the respective Processors, may be arranged on one single entity.

By having separate Processors responsible for the Web Client and the Application Scope Platform, respectively, the first Processor and the Application Scope Platform may remain powered-on on a more long term basis than what is usually the case for the first, more power consuming Processor running the Web Client, and because of the possibility for the Application Scopes to invoke an associated Web Application, even when the Web Application and/or the Web Client are not active, the Web Application may be closed down without the user having to risk to be disregarded with any updates of interest.

A process which is based on the general concept described above will now be described in more detail with reference to the signaling diagrams of FIGS. 1a and 1b, which are schematic illustrations of how a Web Application 103 which is running on a User Device 100, may interact with an associated Application Scope 111, running on an Application Scope Platform 104. It is pointed out that FIGS. 1a and 1b are simplified, schematic illustrations, and that a Web Application may typically be running on any type of User Device, which in the present context normally will be portable, but which may also be a stationary User Device.

As already mentioned above, Web Application 103 and a Web Client (not shown), via which the Web Application is accessed, are run on a first Processor, while the Application Scope Platform is run on another Processor. The Web Client is typically a Web Browser, or a Web Runtime (WRT) Widget enabled Web Client.

It is also pointed out that although Web Application 103 and Application Scope Platform 104 are illustrated as separated from each other, they may be hosted either on separate physical entities, or on one single physical entity. In the former case, both devices may be adapted to communicate with each other e.g. via a conventional short range communication protocol, such as e.g. Bluetooth or Wi-Fi.

Figure 1B:
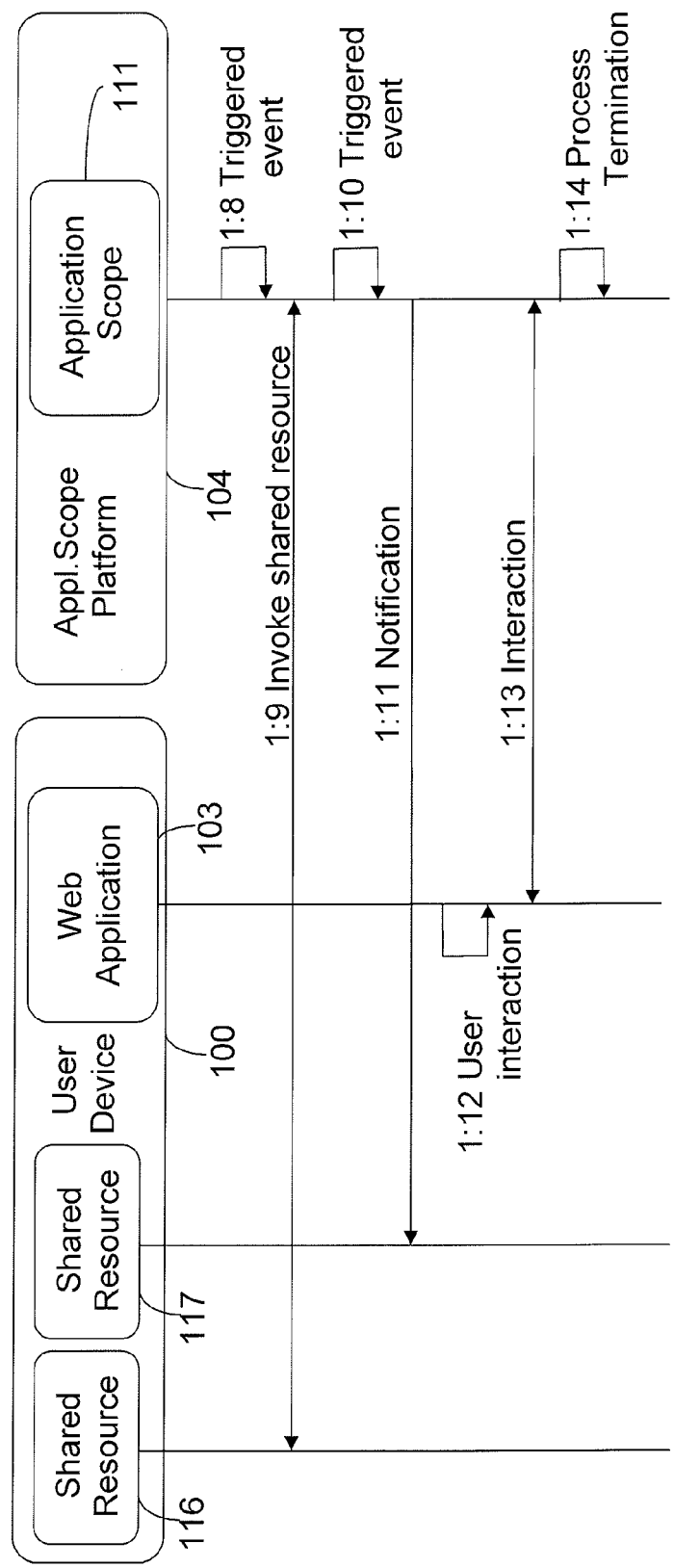
FIG. 1b is another simplified signaling diagram, illustrating another exemplified scenario, involving interaction between a Web Application and an associated Application Scope.

According to FIG. 1a, a user accessing a Web Application 103, may initially be exposed with the present status, as to the Web Applications ability to access an Application Scope Enabler Service from the Web Application 103, as indicated with a first step 1:1. Whether a Web Application will be able to access such a service or not is a service developer dependent issue, such that the service developer may choose to enhance a Web Application with the ability to apply one or more Application Scopes, which may support the Web Application in a number of different ways. In a typical scenario such a status request may be initiated by launching a bootstrap script, comprising code for interrogating a present status of an Application Scope Enabler Service, in association with starting a respective Web Application.

If it is found that an Application Scope Enabler Service is available to the Web Application, the Web Application may request for an Application Scope, specially adapted for the Web Application to be created, or reconnected, if such an Application Scope has previously been created from the Web Application, as indicated with a next step 1:2. Alternatively, the user may be given an option to accept or reject such a request.

At the Application Scope Platform 104 the request activates logic, which is adapted to load common instructions into the requested Application Scope, as indicated with a next step 1:3, before Web Application specific instructions are acquired, as indicated with a subsequent step 1:4, such that the Application Scope can be created, or reconnected to. Both the common instructions and the Web Application specific instructions are provided in the form of executable code, such as e.g. JavaScript code, Python code, or a combination thereof.

The code running in an Application Scope can be seen as constituting a part of an associated Web Application, and as such, it will typically be acquired from the Server where the Web Application resides, but some or all of the required instructions may also be acquired from another Server.

Once loaded, the Application Scope is then executed according to the instructions, as indicated with a step 1:5. According to yet another alternative, the relevant instructions may be a part of the instructions constituting the Web Application, and in such a scenario, the request provided to the Application Scope Platform 104 may comprise all, or a part of, the instructions required for execution of the requested Application Scope 111.

The processing initiated at step 1:5 may involve more or less complex tasks, such as e.g. monitoring a specific Application on an external Server for data updates, downloading such data, and providing the downloaded data to the associated Web Application, optionally after having processed the data. The Application Scope will typically also comprise process steps for determining when the state of the Web Client (not shown), via which Web Application 104 is accessed, and/or the Web Application 103, changes, from open, or active, to closed, or inactive state. Such a change of state may be monitored e.g. by way of using D-Bus mechanism.

In addition, the Application Scope 111 will be configured to determine if the first Processor is running or if it is suspended, and, thus, if it will first have to activate, or wake-up, the Processor, or if only the Web Client and/or the Web Application needs to be opened.

As indicated with a subsequent step 1:6, the processing of an Application Scope 111 will typically be interrupted by one or more events, which are pre-defined to trigger a specific pre-defined activity. An activity, may e.g. be triggered by an event which occur on an external entity, such as e.g. a detection of new data which is accessible from an external source, which may trigger data downloading; an internal activity, which has occurred on the User Device, such as e.g. a pending timer, which may result e.g. in the execution of a pre-defined calculation. An activity may also be triggered on the User Device on which the Web Application is running, e.g. when the monitored battery level of the User Device falls below a predefined threshold.

As indicated with another step 1:6', which may occur any time subsequent to step 1:5 of FIG. 1*a*, but prior to the occurrence of the trigger event, according to step 1:6, the first Processor, on which Web Application 103 is running, is suspended. Such a suspension step may be initiated e.g. due to a timer timeout, with the main purpose of saving energy on the User Device.

In a next step 1:7*a*, the Application Scope 111, running on Application Scope Platform 104, being aware of that the first Processor is now suspended, transmits a request to invoke, activate, or wake up, the suspended Processor. Such a request may typically be transmitted to User Device 100 via the CI (not shown) of User Device 100, where CI may be adapted to wake up the Processor, e.g. by applying a D-Bus mechanism.

As indicated with a step 1:7', such a request first activates a wake-up process of the first Processor. Once the Processor has been activated, the Web Client is opened, as indicated with a next step 1:8', after which the relevant Web Application 103 is finally also activated, as indicate with a subsequent step 1:9'. Once Web Application has once again been activated, further interaction between the Application Scope 111 and Web Application 103 may commence.

FIG. 1*b* is another illustration of a scenario, illustrating how a processing of a Application Scope 111, running on a Application Scope Platform 104 may be executed, according to another exemplary embodiment.

As a prerequisite, at least some of the steps described above, with reference to FIG. 1*a*, are supposed to have occurred, such that an Application Scope 111 has been created, or reconnected, on the Application Scope Platform 104.

As indicated with a step 1:8, a pre-defined event is triggered, whereby the Application Scope 111 is instructed to interact with a Shared Resource 116, residing on the User Device 100. Consequently, the Application Scope 111 invokes the respective Shared Resource 116, as indicated with another step 1:9, such that data may be acquired from the Resource.

An Application Scope 111 may also comprise code, which is configured to enable a running Process to provide a notification of a triggered event to User Device 100. Such a scenario, which may be executed independently of the trigger events exemplified above, is indicated with a subsequent triggering step 1:10, and a subsequent notification step 1:11, where another Shared Resource 117 is notified. Shared Resource 117 may e.g. be a small display, which is located on the outside of a lid of a laptop or a cellular telephone, or any other type of User Interface on which a user may be alerted of a triggered event.

Typically, a notification, such as e.g. a small pop-up, may be provided to the User device without invoking a respective Web Application, but not without invoking the Processor which is supporting the Web Client, which is typically be the main CPU of the User Device. In such a case, a notified user may decide, on the basis of the information provided in the notification, whether he wishes to start the Web Application 103, or not. Such an option is illustrated with another step 1:12 in FIG. 1*b*. If a user has chosen to start the Web Application 103 in step 1:12, he may continue to interact with Application Scope 111, as indicated with a subsequent step 1:13.

The Application Scope 111 typically continues to run, until the process terminates itself, e.g. until one or more pre-defined tasks have been successfully executed, or until it is actively terminated from the associated Web Application 103, or on the initiative of a user. In FIG. 1*b*, Application Scope 111 is terminated by the process itself, as indicated with a final step 1:14.

Figure 2:
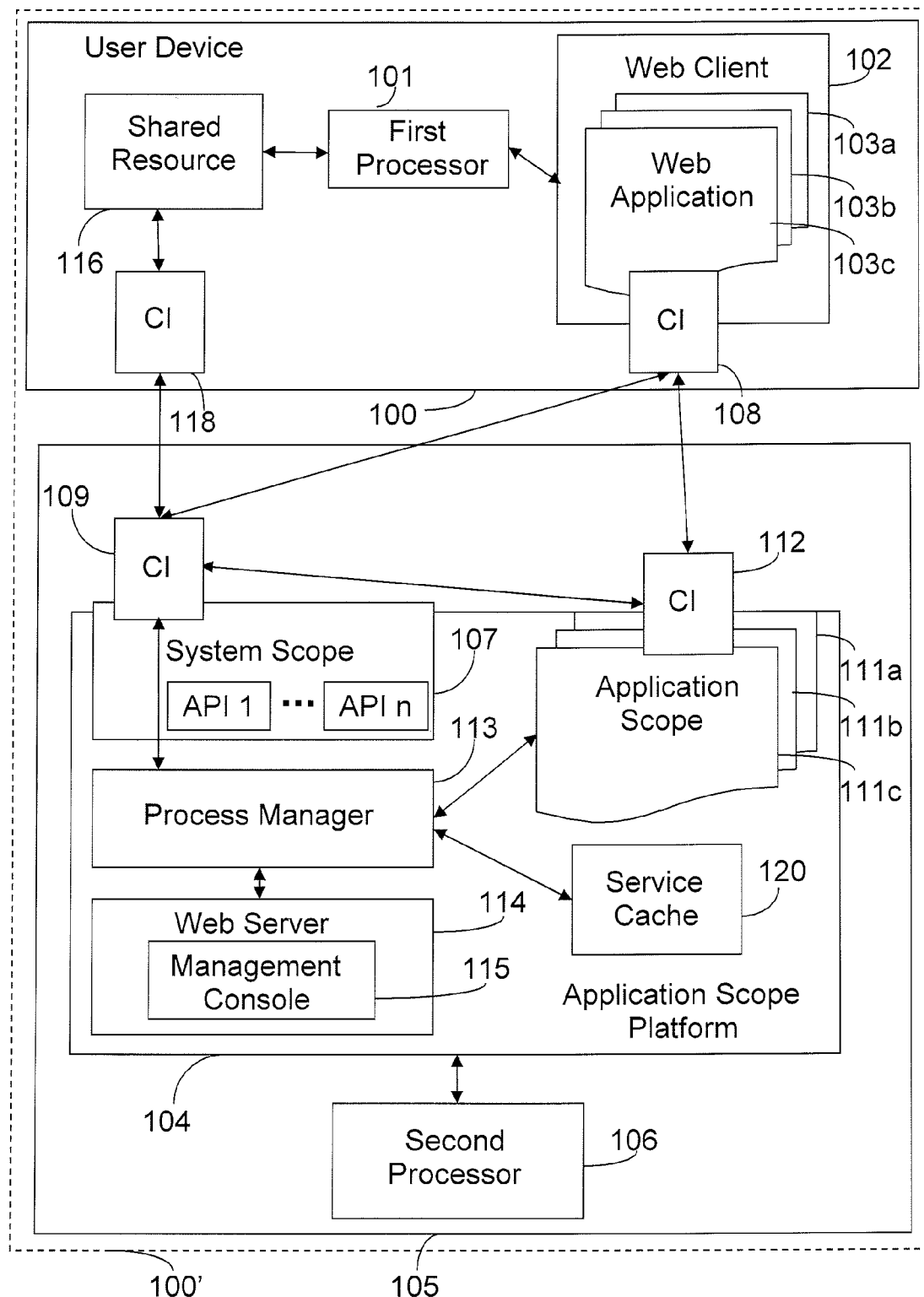
FIG. 2 is a simplified block diagram, illustrating a configuration of User Device functionality and functionality of an associated arrangement, comprising an Application Scope Platform, according to one exemplifying embodiment.

FIG. 2 is a block diagram which illustrates a configuration, comprising an arrangement 105 and a User Device 100, according to one exemplary embodiment, which is configured to execute a method according to some or all of the method steps suggested above.

According to FIG. 2, a User Device 100 comprise a first Processor 101 and a Web Client 102, which enables a user to access one or more Application Scope enabled Web Applications 103*a*, 103*b*, 103*c*, i.e. Web Applications, which are adapted to communicate and interact with an Application Scope, which is running on a second Processor 106 on an Application Scope Platform 104.

In FIG. 2, arrangement 105 is presented as a separate device, hosting the Application Scope Platform 104 and the second Processor 106. However, as already mentioned above, a User Device 100' may instead be configured to host both the first and the second Processor, together with the respective associated functionality on one single device.

The Application Scope Platform 104, may host one or more Application Scopes 111*a*, 111*b*, 111*c*, each of which have been pre-configured to execute instructions, for the purpose of supporting a specific Web Application, by executing one or more event triggered tasks.

According to the claimed invention, the Application Scope Platform 104 does not require any regular Graphic User Interface (GUI) components, thereby simplifying the implementation of the Application Scope Platform 104, which requires a low power level to run. Instead of having to rely on a conventional GUI, the Application Scope Platform 104 is provided with a built-in Web Server 114.

The Web application use the Web Server 114 for interrogating, or Probing, whether the Application Scope Platform 104 has been installed on the User Device 100, 100', and typically also for acquiring a part of a boot strap code, which is not included in the typically very small boot strap file, which is run when the Web Application is Started. This starting procedure will be described in more detail below with reference to FIG. 3.

Web Server 114 also comprises a HTTP based Management Console 115, which provides an interface between the Web Client 102 and the Web Server 114, which allows a user both to manage an Application Scope 111*a*, 111*b*, 111*c*, e.g. such that the processing instructions of an Application Scopes may be changed, and to terminate the Application Scope.

The Application Scope Platform 104 also comprises a Process Manager 113, which is adapted to create, manage and terminate Application Scopes 111*a*, 111*b*, 111*c* in response to a request from a Web Application. The Process Manager 113 comprises logic which is adapted to create an Application Scope 111a, 111b, 111c in response to receiving such a request via a CI. In FIG. 2 Process Manager 113 shares CI 109 with System Scope 107, but, depending on the configuration, it may be provided with a separate CI.

An Application Scope is created by acquiring common instructions, which once loaded into Web Application specific instructions starts to run accordingly.

Once an Application Scope 111a, 111b, 111c has been created, Process Manager 113 may also manage and terminate the Application Scope, either in response to receiving a request from a Web Application 103a, 103b, 103c, or from a user, which may access the Process Manager 113, via Web Client 102 and Web Server 114.

An Application Scope 111a, 111b, 111c, will persist for as long as the Application Scope Platform is powered on, or until it is explicitly closed from a corresponding Web Application, either automatically, in response to an appropriate instruction, or in response to a user interaction requesting the Application Scope to be closed. In addition, an Application Scope may be terminated by itself, e.g. when one or more pre-defined tasks have been completely executed.

The Application Scope Platform 104 may typically also comprise a functional entity, referred to as a System Scope 107, which is adapted to manage one or more Shared Resources 116, residing on the User Device 100, which may be shared between active Application Scopes 111a, 111b, 111c, via one or more trusted Application Program Interfaces (API) API 1 . . . API n. The System Scope 107 may provide enabler realizations, which can be invoked from an Application Scope 111a, 111b, 111c, whenever a Shared Resource 116 is required. A Shared Resource may e.g. be a network connection, providing access to the Internet, a display arrangement, for enabling user notification of an event, or a memory means, where shared data can be stored for later retrieval. A share memory means is an option which may be useful in situations when it is required that pre-cached data is made available to the first Processor 101.

In addition functionality, such as e.g. a Global Positioning System (GPS) function, or sensors, such as e.g. temperature sensors, may constitute other types of Shared Resources, which can be used as data sources for running Application Scopes.

A running Application Scope 111a, 111b, 111c requiring access to a Shared Resource 116, may access the Resource via an API of System Scope 107 and CI 109, 118. By invoking a notification API of System Scope 107, an Application Scope 111a, 111b, 111c may e.g. be able to notify a user of a triggered event.

Once an Application Scope 111a, 111b, 111c has been created, the Web Application 103a, 103b, 103c may communicate with the associated Application Scope 111a, 111b, 111c via a communication link, which is provided by Communication Interfaces (CIs) 108, 109, 112, 118. In its simplest form, the Web Client 102 may be provided with a plug-in, or any other extension, but preferably a communication link, which rely on Web Sockets or HTTP Comet is to be applied. Such a communication link may support a Remote Procedure Call (RPC) mechanism, or a Representational State Transfer (REST) mechanism.

In addition, log messages of an Application Scope, such as e.g. a text message, indicating a result of a performed calculation, may be transported in a dedicated channel over the established communication links, thereby enabling these messages to be displayed in the associated Web Application 103a, 103b, 103c.

A Web Application may get access to the Application Scope Enabler Service by executing instructions, constituting a part of a respective Web Application. Such instructions may typically be implemented in the Web Application as a Bootstrap Script. The Bootstrap Script, or corresponding code, typically comprise a short instruction which is adapted to initiate a status request process for checking for presence of an Application Scope Enabler Service, and to enable a Web Application to create a new required Application Scope, or to reconnect to an Application Scope, which has been created at an earlier stage.

Figure 3:
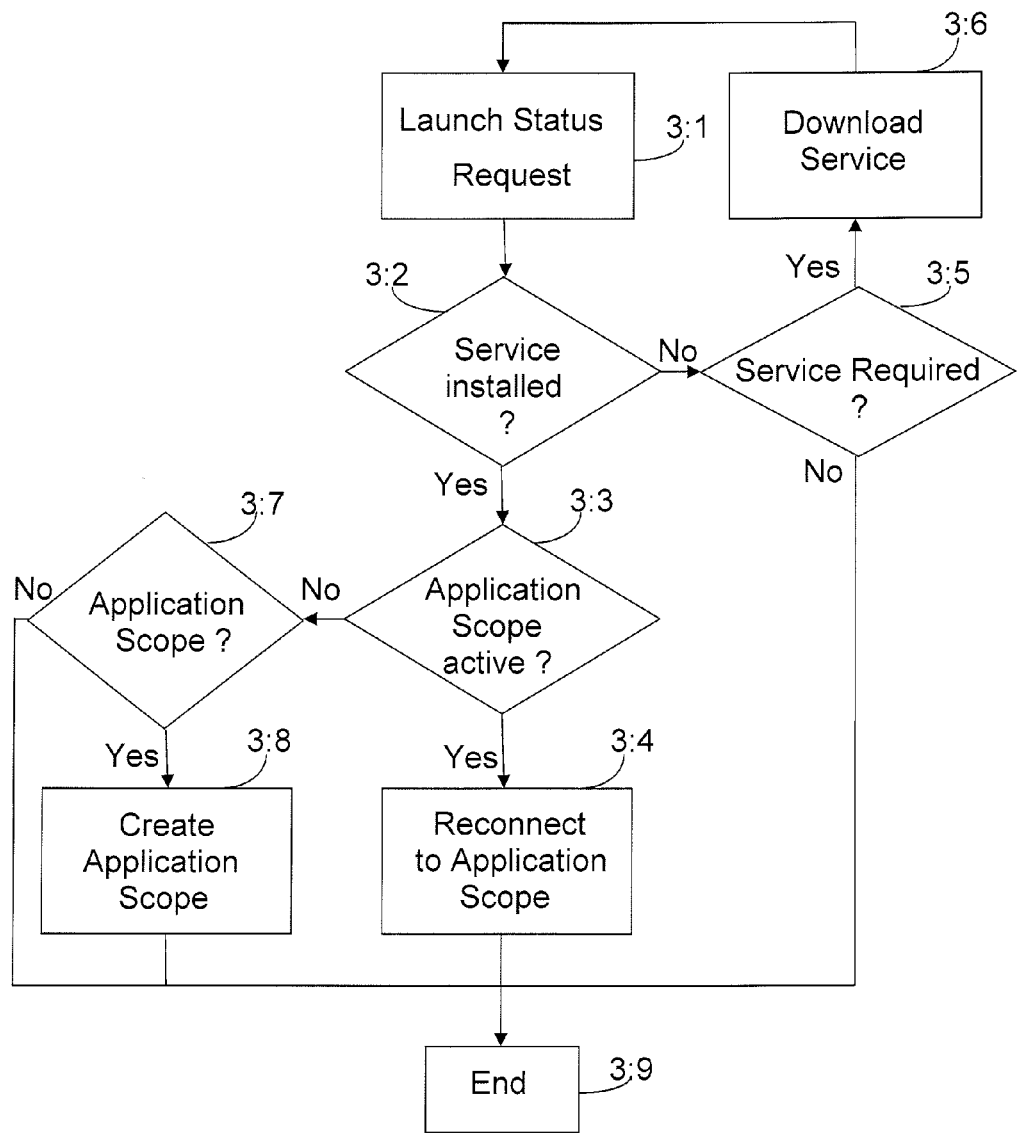
FIG. 3 is a flow chart, illustrating a procedure for launching a status request on the status of an Application Scope Service, in association with starting a Web Application, according to one exemplifying embodiment.

An initiation procedure which describes how a running Web Application, 103a, 103b, 103c may establish contact with a Application Scope Platform 104, such that an Application Scope can be created, or reconnected, will now be described in more detail below with reference to flow chart of FIG. 3.

In a first step 3:1, a status request is launched from a Web Application, typically by activating a Bootstrap Script. Dependent on the status event triggered by such a request, different options may be executed by the Web Application. The Bootstrap Script may also be adapted to register listeners for one, or a set of custom status events, in order to enable automatic handling of the result obtained from a status request.

If, in a subsequent step 3:2, it is determined that a Application Scope Enabler Service is already installed, it is then determined, in a subsequent step 3:3, if there is presently any Application Scope running for the Web Application, and if this is the case, the Web Application can reconnect to that Application Scope, as indicated with another step 3:4.

Referring again to FIG. 2, the Web Application 103a, 103b, 103c, may access Process Manager 113 via CI 108, instructing Process Manager 113 to reconnect to the respective Application Scope 111a, 111b, 111c.

If on the other hand it is found in step 3:2 that no Application Scope Enabler Service is installed, another check may be performed, as indicated with another step 3:5, where a user may choose to accept or reject an Application Scope Enabler Service for the Web Application, i.e. to accept or reject the Web Application 103a, 103b, 103c access to the Application Scope Platform 104, and the services, in the form of Web Application specific Application Scopes, which may be provided from the Platform. If access is accepted, the Application Scope Enabler Service is downloaded to the Web Application, as indicated with a step 3:6, and the process described above, starting with step 3:1 is repeated once again, this time, however, with access to the Application Scope Platform and its services. Instructions required to start the Application Scope Enabler Service will typically be acquired from a Service Cache 120, or any other corresponding means of the Application Scope Platform 104. Alternatively, the service may be downloaded unconditionally, in association with staring a respective Web Application, especially if Application Scopes are compulsory when running the service/s provided by the Web Application.

If, on the other hand, no Application Scope Enabler Service is wanted by the user, the described initiation procedure is instead terminated with step 3:9, and the started Web Application will run in a conventional, non Application Scope enabled mode.

If in step 3:2 it is instead found that an Application Scope Enabler Service is already installed and available to the Web Application, but in a subsequent step 3:3 it is found that no Application Scope is presently active, the Web Application may request a new Application Scope to be created, as indicated with a step 3:8. However, as indicate with a preceding step 3:7, a user may first choose to accept or reject such a request, made by the Web Application. If creation of a new Application Scope is not accepted by the user, the initiation process is terminated at step 3:9, and the started Web Application will run in a conventional, non Application Scope enabled mode, while if instead the request is granted by the user, a requested Application Scope is created, as indicated with step 3:8, before the initiation procedure is terminated in step 3:9. In the latter case, the Web Application typically connects to a Process Manager, or a corresponding functional unit, which is adapted to create the respective Application Scope, by executing relevant instructions/code, accordingly. More specifically, The Web Application may forward a URL, pointing at Application Scope specific code in a request, thereby enabling downloading of the relevant additional code, and enabling creation of the requested Application Scope. Alternatively, the request may comprise all, or parts of relevant Application Scope specific instructions, which is necessary for the Process Manager to create the Application Scope.

Figure 4:
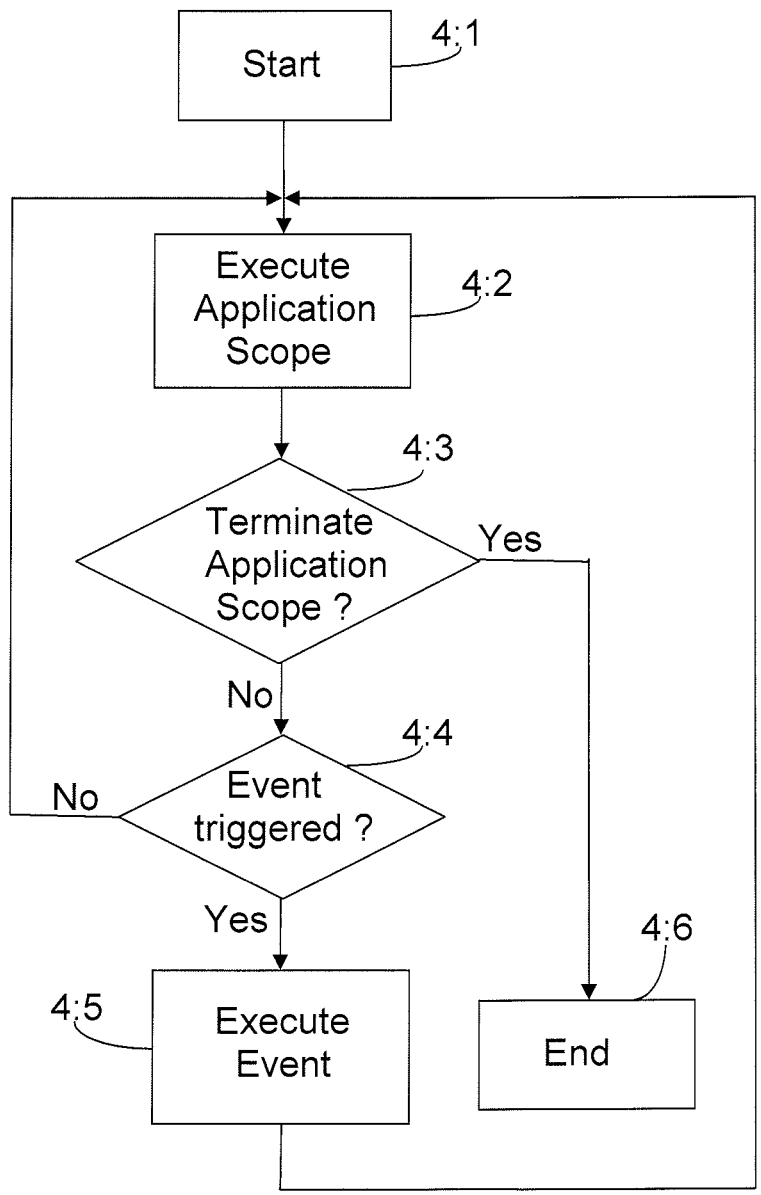
FIG. 4 is another flow chart, illustrating in general Terms, a procedure for executing an Application Scope, according to one exemplary embodiment.

FIG. 4 is a flow chart, illustrating general processing steps of an Application Scope at an Application Scope Platform, according to one exemplary embodiment. Starting at step 4:1 it is to be assumed that either a connection event has been triggered, an Application Scope has been created, according to step 3:8 of FIG. 3, or a reconnect event has been triggered, and a respective Application Scope has been reconnected to, on the basis of already downloaded code, according to step 3:4 of FIG. 3.

Execution of the Application Scope is started, according to the instructions, as indicated with a next step 4:2.

The Application Scope is configured to execute certain events, in response to recognizing an associated event based trigger, as indicate with another step 4:4. Such an event may e.g. comprise the step of invoking a Shared Resource, from which certain data can be fetched, processed and/or provided to the Web Application. An Application Scope may include one or more event triggers, depending on the requirements from the associated Web Applications. The Application Scope may also be configured to provide a notification of a pre-defined event to the associated Web Application, or to a Shared Resource comprising a UI arrangement. Such an event execution process is indicated with a subsequent step 4:5.

The described process is normally executed until the Application Scope is terminated, as indicated with a step 4:6, when the Application Scope may be terminated e.g. in response to receiving a request from the associated Web Application; in response to a pre-defined termination trigger of the Application Scope code, e.g. in response to completion of one or more pre-defined tasks, or as a result of a user, actively having closing the Application Scope by interacting with the Web Server/Management Console.

Throughout this document, the terms used for expressing logical devices, entities or nodes, such as e.g. "Process Manager", "System Scope", "Application Scope" and "Application Scope Platform" are to be interpreted merely as exemplifying expressions, which may be expressed in a number of other, alternative ways.

In addition, while the described arrangements and method steps have been described with reference to specific exemplary embodiments, the description is generally only intended to illustrate the described inventive concept and should not be taken as limiting the scope of what has been defined by the appended claims.

ABBREVIATIONS

API Application Programming Interface
CPU Central Processing Unit
D-BUS Desktop bus
GUI Graphical User Interface
HTML Hyper Text Markup Language
HTTP Hyper Text Transport Protocol
JSON JavaScript Object Notation
RPC Remote Procedure Call
REST Representational State Transfer
URL Uniform Resource Locator
WRT Web Runtime
WWW World Wide Web
XML Extensible Markup Language

The invention claimed is:

1. An Application Scope Platform configured to enable communication between a Web Application, accessible via a Web Client of a User Device, and an Application Scope, executable on said Application Scope Platform, said Web Application being adapted to run on a first Processor of the User Device, and wherein said Application Scope Platform comprises:
   a Process Manager, adapted to create and manage the Application Scope, being an event triggered Application Scope executable on said Application Scope Platform, and
   a Communication Interface adapted to enable Web Application interaction between said Application Scope Platform and said Web Application via said Web Client, said Application Scope being adapted to run on a second Processor on the Application Scope Platform,
   wherein said Web Application is an Application Scope enabled Web Application,
   wherein said Application Scope Platform is implemented on an entity including the second Processor which is physically separated from the User Device including the first Processor that is adapted to run the Web Application,
   wherein said Application Scope running on the second processor that is physically separated from the User Device is adapted to invoke said Web Application that is running on the first Processor of the User Device, responsive to said first Processor of the User Device being in an open state,
   wherein said Application Scope running on the second processor that is physically separated from the User Device is adapted to invoke said Web Application that is running on the first Processor of the User Device, responsive to said first Processor being in a closed state,
   wherein said Application Scope running on the second processor that is physically separated from the User Device is adapted to invoke said Web Application that is running on the first Processor of the User Device, responsive to said Web Client being in an open state,
   wherein said Application Scope running on the second processor that is physically separated from the User Device is adapted to invoke said Web Application that is running on the first Processor of the User Device, responsive to said Web Client being in a closed state,
   wherein said Application Scope running on the second processor that is physically separated from the User Device is adapted to invoke said Web Application that is running on the first Processor of the User Device, responsive to said Web Application being in an open state, and wherein said Application Scope running on the second processor that is physically separated from the User Device is adapted to invoke said Web Application that is running on the first Processor of the User Device, responsive to said Web Application being in a closed state.

2. An Application Scope Platform, according to claim 1, wherein said Process Manager is adapted to associate an Application Scope enabled Web Application with an Application Scope by applying a shared key mechanism.

3. An Application Scope Platform, according to claim 1, wherein said Process Manager is adapted to create the Application Scope by acquiring instructions, in the form of executable code, and by loading said instructions into said Application Scope, in response to receiving a request to create the Application Scope from said Web Application.

4. An Application Scope Platform, according to claim 3, wherein said Application Scope comprises instructions which enable the Application Scope to monitor at least one activity for at least one triggered event.

5. An Application Scope Platform, according to claim 3, wherein said Application Scope comprises instructions which enable the Application Scope to invoke a Shared Resource of said User Device, and/or an associated Web Application, in response to recognizing the occurrence of a triggered event.

6. An Application Scope Platform, according to claim 1, wherein said Process Manager is adapted to reconnect a Web Application with an associated Application Scope, in response to receiving such a request from said Web Application, or from said Application Scope.

7. An Application Scope Platform, according to claim 1, further comprising a System Scope, constituting instructions which enable said Application Scope to use one or more Shared Resources.

8. An Application Scope Platform, according to claim 7, wherein said System Scope is adapted to enable said Application Scope access to one or more of said Shared Resources via said Communication Interface.

9. An Application Scope Platform, according to claim 8, wherein said access is provided via a D-Bus mechanism.

10. An Application Scope Platform, according to claim 8, wherein said Shared Resource is adapted to run on said first Processor of the User Device.

11. An Application Scope Platform, according to claim 8 wherein said Shared Resource is adapted to run on a Processor other than said first Processor of the User Device.

12. An Application Scope Platform, according to claim 7, wherein said System Scope is adapted to provide one or more enablers, each of which is adapted to be invoked from said Application Scope, in response to recognizing a triggered pre-defined event.

13. An Application Scope Platform, according to claim 12, wherein each of said one or more enablers is an Application Program Interface (API).

14. An Application Scope Platform, according to claim 13, wherein said one or more API is at least one of a: network API, adapted to receive and handle updates received from a network node; notification API, adapted to notify an associated Application Scope enabled Web Application of an event; sensor API, adapted to enabling acquiring of data from a data source of said User Device; storage API, adapted to enable storing, and downloading of shared data on/from a Shared storage area.

15. An Application Scope Platform according to claim 1, wherein said Application Scope Platform is adapted to enable communication between a Web Application and an associated Application Scope by applying a Remote Procedure Call mechanism.

16. An Application Scope Platform according to claim 1, wherein said Application Scope Platform is implemented as an integrated part of said User Device.

17. A method according to claim 1 wherein the Application Scope is a background process that runs in the background of the Web Application, wherein the Communication Interface is adapted to enable Web Application interaction between said Application Scope Platform and said Web Application over a wireless interface, and wherein the Web Client comprises a Web Browser.

18. A User Device for enabling a Web Application to communicate with an Application Scope running on an Application Scope Platform, said User Device comprising:

a Web Client adapted to enable communication between said Web Application and said Application Scope Platform, said Web Application comprising executable instructions which enable the Web Application to create an Application Scope on said Application Scope Platform, wherein said Web Application is running on a first Processor of the User Device and said Application Scope is running on a second Processor on the Application Scope Platform, wherein said Application Scope Platform is implemented on an entity including the second Processor which is physically separated from the User Device including the first Processor, and a Communication Interface, which enables said Application Scope running on the second processor that is physically separated from the User Device to invoke said Web Application that is running on the first Processor of the User Device, responsive to said first Processor on the User Device being in an open state, which enables said Application Scope running on the second processor that is physically separated from the User Device to invoke said Web Application that is running on the first Processor of the User Device, responsive to said first Processor on the User Device being in a closed state, which enables said Application Scope to invoke said Web Application responsive to said Web Client being in an open state, which enables said Application Scope to invoke said Web Application responsive to said Web Client being in a closed state, which enables said Application Scope to invoke said Web Application responsive to said Web Application being in an open state, and which enables said Application Scope to invoke said Web Application responsive to said Web Application being in a closed state.

19. A User Device according to claim 18, further comprising a Shared Resource, comprising a User Interface arrangement, which is adapted to present a notification, provided from said Application Scope, to a user.

20. A User Device according to claim 18 wherein the Application Scope is a background process that runs in the background of the Web Application, wherein the Web client is adapted to enable communication between said Web Application and said Application Scope Platform over a wireless interface, and wherein the Web Client is a Web Browser.

21. A method of enabling communication between an Application Scope Platform and a Web Application, said Web Application being accessible via a Web Client of a User Device and a Communication Interface, wherein said Web Application is adapted to run on a first Processor of the User Device, said method comprising the following steps to be executed on said Application Scope Platform:

receiving a request to create an event triggered Application Scope associated with said Web Application from said Web Application at the User Device;

creating said Application Scope by acquiring executable instructions and by loading said instructions into said Application Scope, and executing said Application Scope, wherein said Application Scope is adapted to run on a second Processor on the Application Scope Platform, wherein said Application Scope Platform is implemented on an entity including the second Processor which is physically separated from the User Device including the first Processor that is adapted to run the Web Application, wherein said Application Scope running on the second processor that is physically separated from the User Device is adapted to invoke said Web Application that is running on the first Processor of the User Device, responsive to said first Processor of the User Device being in an open state, wherein said Application Scope running on the second processor that is physically separated from the User Device is adapted to invoke said Web Application that is running on the first Processor of the User Device, responsive to said first Processor being in a closed state, wherein said Application Scope running on the second processor that is physically separated from the User Device is adapted to invoke said Web Application that is running on the first Processor of the User Device, responsive to said Web Client being in an open state, wherein said Application Scope running on the second processor that is physically separated from the User Device is adapted to invoke said Web Application that is running on the first Processor of the User Device, responsive to said Web Client being in a closed state, wherein said Application Scope running on the second processor that is physically separated from the User Device is adapted to invoke said Web Application that is running on the first Processor of the User Device, responsive to said Web Application being in an open state, and wherein said Application Scope running on the second processor that is physically separated from the User Device is adapted to invoke said Web Application that is running on the first Processor of the User Device, responsive to said Web Application being in a closed state.

22. A method according to claim 21, said method comprising the following steps to be executed by the Application Scope:

monitoring at least one activity for at least one triggered event, and executing an activity in response to recognizing a Triggered event.

23. A method according to claim 21, wherein said executing step comprises at least one of the steps of: activating one or both of the first Processor of the User Device and the Web Client; invoking said Web Application; and/or invoking a Shared Resource and providing a notification of said triggered event to said User Device.

24. A method according to claim 23, wherein said notification step comprises providing a notification to a User Interface arrangement of a Shared Resource of said User Device.

25. A method according to claim 23, wherein said activation and/or invoking step are/is performed via an Inter-Process Communication System.

26. A method according to claim 25, wherein said Inter-Process Communication System is based on a Remote Procedure Call (RPC) mechanism or on a Representational State Transfer (REST) mechanism.

27. A method according to claim 21 wherein the Application Scope is a background process that runs in the background of the Web Application, wherein receiving the request comprises receiving the request through the Communication Interface over a wireless interface between said Application Scope Platform and said Web Application, and wherein the Web Client comprises a Web Browser.

* * * * *